United States Patent
Paul et al.

(10) Patent No.: US 9,721,259 B2
(45) Date of Patent: Aug. 1, 2017

(54) RULES-BASED SELECTION OF COUNTERFEIT DETECTION TECHNIQUES

(71) Applicant: Accenture Global Services Limited, Dublin (IE)

(72) Inventors: Sanjoy Paul, Bangalore (IN); Gurdeep Singh, Bangalore (IN); Sankalp Sharma, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 13/782,043

(22) Filed: Mar. 1, 2013

(65) Prior Publication Data
US 2014/0101063 A1    Apr. 10, 2014

(30) Foreign Application Priority Data
Oct. 8, 2012 (IN) .......................... 4171/CHE/2012

(51) Int. Cl.
*G06Q 99/00* (2006.01)
*G06Q 30/00* (2012.01)

(52) U.S. Cl.
CPC ................ *G06Q 30/0185* (2013.01)

(58) Field of Classification Search
USPC ........................................... 705/318
See application file for complete search history.

(56) References Cited

U.S. PATENT DOCUMENTS

| 6,069,955 | A | 5/2000 | Coppersmith et al. |
| 6,313,787 | B1 * | 11/2001 | King ....................... G01S 19/05 342/357.42 |
| 6,987,868 | B1 * | 1/2006 | Atarashi et al. .............. 382/112 |
| 6,996,543 | B1 | 2/2006 | Coppersmith et al. |

(Continued)

FOREIGN PATENT DOCUMENTS

| CN | 101561863 A | 10/2009 |
| CN | 102270294 A | 12/2011 |

(Continued)

OTHER PUBLICATIONS

"European Search Report on Application No. EP 13004702.0", dated Jan. 17, 2014, European Patent Office.

(Continued)

*Primary Examiner* — Dennis Ruhl
*Assistant Examiner* — Patrick Mcatee
(74) *Attorney, Agent, or Firm* — Mannava & Kang, P.C.

(57) ABSTRACT

A counterfeit detection system may include a memory storing a module comprising machine readable instructions to determine a X-identification (XID) associated with a product. The XID may include an unencrypted component and/or an encrypted component associated with a parameter associated with the product. The machine readable instructions may further include selecting one or more validation rules, from a plurality of validation rules, to select one or more validation techniques from a plurality of validation techniques used to determine an authenticity of the product. The machine readable instructions may further include using (Continued)

the one or more selected validation techniques to determine the authenticity of the product based on the XID associated with the product. The counterfeit detection system may include a processor to implement the module.

19 Claims, 12 Drawing Sheets

(56) References Cited

U.S. PATENT DOCUMENTS

| | | | |
|---|---|---|---|
| 7,283,630 B1* | 10/2007 | Doljack | 380/55 |
| 7,364,074 B2* | 4/2008 | He et al. | 235/385 |
| 8,666,841 B1* | 3/2014 | Claridge | G06Q 30/00 |
| | | | 705/26.1 |
| 2002/0099843 A1* | 7/2002 | Fruchtman | H04L 29/06 |
| | | | 709/232 |
| 2003/0167235 A1* | 9/2003 | McKinley et al. | 705/51 |
| 2003/0234718 A1 | 12/2003 | Fujisawa et al. | |
| 2004/0112962 A1 | 6/2004 | Farrall | |
| 2005/0060171 A1* | 3/2005 | Molnar | G06K 17/0022 |
| | | | 340/572.1 |
| 2006/0026268 A1* | 2/2006 | Sanda | G06F 9/5011 |
| | | | 709/221 |
| 2006/0059574 A1* | 3/2006 | Fayad | H03K 19/17768 |
| | | | 726/34 |
| 2007/0083649 A1* | 4/2007 | Zuzga | G06F 11/3419 |
| | | | 709/224 |
| 2007/0119918 A1* | 5/2007 | Hogg | G06Q 20/04 |
| | | | 235/380 |
| 2007/0175974 A1* | 8/2007 | Self et al. | 235/375 |
| 2007/0263912 A1 | 11/2007 | Biarnes et al. | |
| 2008/0011841 A1* | 1/2008 | Self et al. | 235/385 |
| 2008/0074682 A1 | 3/2008 | Komatsubara | |
| 2008/0209512 A1* | 8/2008 | Silverbrook et al. | 726/2 |
| 2008/0312851 A1* | 12/2008 | Kagan | G01D 4/002 |
| | | | 702/60 |
| 2009/0087076 A1 | 4/2009 | Jenrick et al. | |
| 2009/0144199 A1* | 6/2009 | Oertel | 705/50 |
| 2009/0177470 A1* | 7/2009 | Beach | G10L 15/30 |
| | | | 704/235 |
| 2009/0257101 A1 | 10/2009 | Gurak | |
| 2009/0283583 A1* | 11/2009 | Cowburn et al. | 235/375 |
| 2009/0286570 A1 | 11/2009 | Pierce, Jr. | |
| 2009/0327008 A1* | 12/2009 | Collins | G06Q 50/22 |
| | | | 705/35 |
| 2010/0019026 A1* | 1/2010 | Hochfield et al. | 235/375 |
| 2010/0131592 A1* | 5/2010 | Zhang | G06F 9/5044 |
| | | | 709/203 |
| 2010/0179857 A1* | 7/2010 | Kalaboukis et al. | 705/10 |
| 2011/0093113 A1* | 4/2011 | Sager et al. | 700/115 |
| 2011/0107100 A1* | 5/2011 | Loken | 713/170 |
| 2011/0125658 A1* | 5/2011 | Lanxner | G06Q 30/0185 |
| | | | 705/318 |
| 2011/0133887 A1 | 6/2011 | Tian et al. | |
| 2011/0153512 A1* | 6/2011 | Peckover | 705/318 |
| 2011/0167010 A1* | 7/2011 | Soppera et al. | 705/318 |
| 2011/0200256 A1 | 8/2011 | Saubat et al. | |
| 2011/0231316 A1* | 9/2011 | Carroll, III | 705/44 |
| 2012/0024956 A1 | 2/2012 | Chen | |
| 2012/0106851 A1 | 5/2012 | Lei | |
| 2012/0158541 A1* | 6/2012 | Ganti | G06Q 30/0185 |
| | | | 705/26.35 |
| 2012/0215704 A1* | 8/2012 | Simpson | G06Q 30/018 |
| | | | 705/318 |
| 2012/0272221 A1* | 10/2012 | Pessoa et al. | 717/127 |
| 2013/0124614 A1* | 5/2013 | Yokoyama | H04L 41/5038 |
| | | | 709/203 |
| 2013/0170758 A1* | 7/2013 | G | 382/218 |
| 2013/0173484 A1* | 7/2013 | Wesby | 705/318 |
| 2013/0290379 A1 | 10/2013 | Rhoads et al. | |
| 2013/0297512 A1* | 11/2013 | Phillips et al. | 705/44 |
| 2014/0012799 A1* | 1/2014 | Eberlein | G06Q 10/10 |
| | | | 707/603 |
| 2014/0029073 A1 | 1/2014 | Wang et al. | |
| 2014/0095398 A1* | 4/2014 | Lin | G06Q 30/0185 |
| | | | 705/318 |
| 2014/0132799 A1 | 5/2014 | Kim et al. | |
| 2014/0214758 A1 | 7/2014 | Tripathi et al. | |

FOREIGN PATENT DOCUMENTS

| | | |
|---|---|---|
| DE | 102006016830 A1 | 10/2007 |
| JP | 2000-232578 | 8/2000 |
| WO | 97/25798 A1 | 7/1997 |
| WO | 2009/074866 A2 | 6/2009 |

OTHER PUBLICATIONS

"European Search Report on Application No. EP 13004702.0", dated Nov. 28, 2014, European Patent Office.
Anonymous: Padding (Cryptography)—Wikipedia, the free encyclopedia, Sep. 28, 2012, Retrieved from the Internet on Nov. 24, 2014.
Sameera Khan et al: "A Review on Offline Signature Recognition and Verification Techniques", International Journal of Advanced Research in Computer and Communication Engineering, Jun. 2, 2014, pp. 6879-6882.

* cited by examiner

… (1)

RULES-BASED SELECTION OF COUNTERFEIT DETECTION TECHNIQUES

BACKGROUND

The presence of counterfeit products in a market can negatively impact the value of authentic products. For customers desiring to purchase authentic products, the presence of counterfeit products can deter such customers from purchasing products that may in fact be authentic or lead to the undesirable purchase of counterfeit products. While measures, such as, for example, limiting retailers that may sell a product can be taken to guarantee authenticity of a product, such measures can be bypassed or prove to be ineffective for certain products. Such measures can also prove to be ineffective for customers who may question the authenticity of a retailer.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
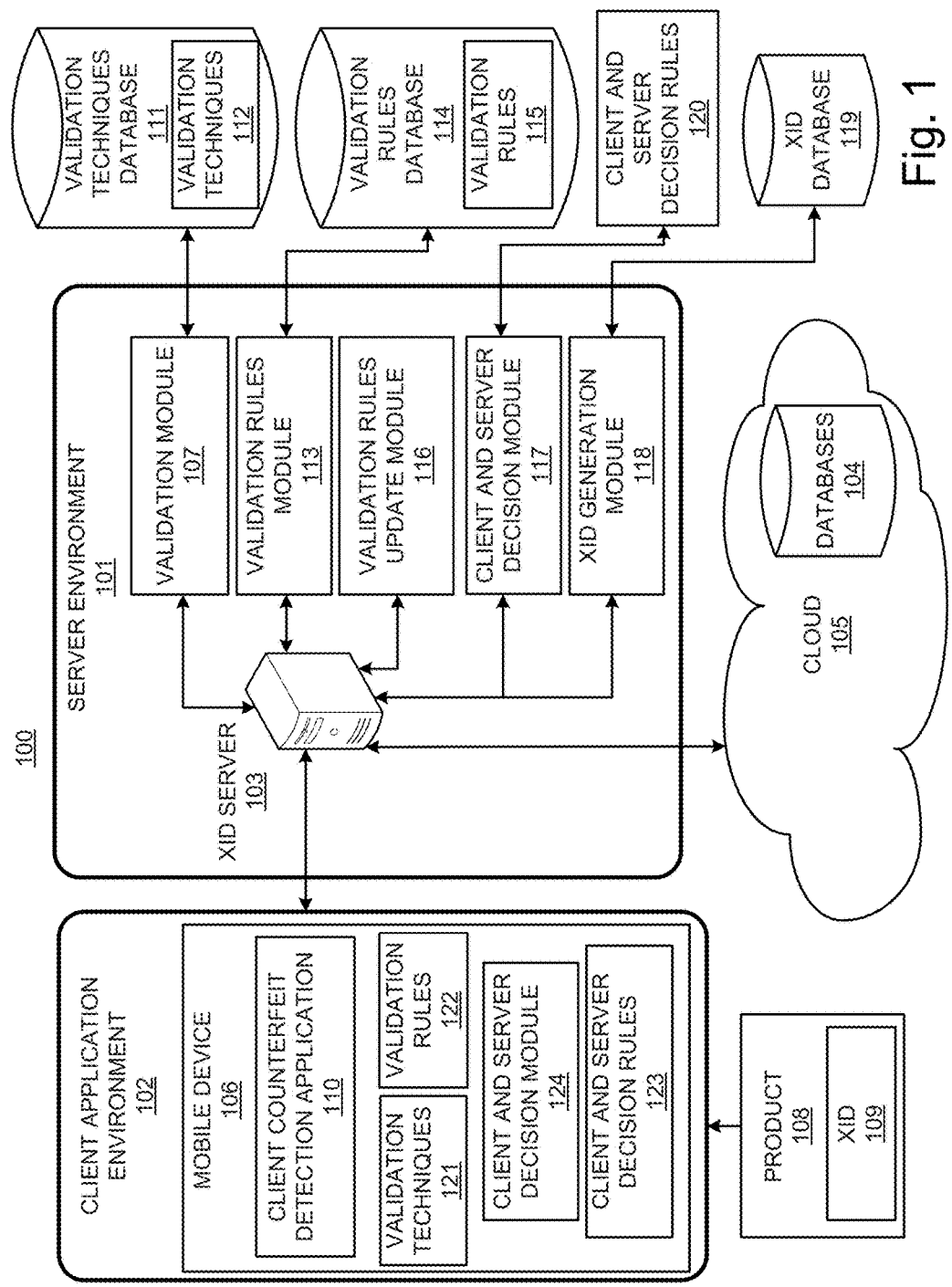
FIG. 1 illustrates an architecture of a counterfeit detection system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A counterfeit detection system is described herein and generally includes a memory storing a module comprising machine readable instructions to determine a X-identification (XID) associated with a product. The XID may include an unencrypted component and/or an encrypted component associated with a parameter associated with the product. The parameter may include, for example, a characteristic of the product, a location of the product etc. The machine readable instructions may further include selecting one or more validation rules, from a plurality of validation rules, to select one or more validation techniques from a plurality of validation techniques used to determine an authenticity of the product. The machine readable instructions may further include using the one or more selected validation techniques to determine the authenticity of the product based on the XID associated with the product. The counterfeit detection system may include a processor to implement the module.

A method for counterfeit detection is described herein and generally includes determining a XID associated with a product. The method may further include selecting one or more validation rules, from a plurality of validation rules, to select one or more validation techniques from a plurality of validation techniques used to determine an authenticity of the product. The method may also include using, by a processor, the one or more selected validation techniques to determine the authenticity of the product based on the XID associated with the product.

A non-transitory computer readable medium is described herein and includes stored thereon machine readable instructions for counterfeit detection. The machine readable instructions when executed cause a computer system to determine a XID associated with a product. The machine readable instructions may further include selecting one or more validation rules, from a plurality of validation rules, to select one or more validation techniques from a plurality of validation techniques used to determine an authenticity of the product. The machine readable instructions may further include using, by a processor, the one or more selected validation techniques to determine the authenticity of the product based on the XID associated with the product.

The system and method described herein provide a technical solution to the technical problem of counterfeit detection. In many instances, manual counterfeit detection is not a viable solution given the number of available counterfeit products on the market, and sophisticated counterfeiting techniques. The system and method described herein provide the technical solution of objectively and automatically determining whether a product is authentic or a counterfeit based on evaluation of unencrypted and/or encrypted components of a XID associated with a product. The system and method described herein further provide the technical solution of objectively and automatically determining whether a product is authentic or a counterfeit by selecting one or more validation rules, from a plurality of validation rules, to select one or more validation techniques from a plurality of validation techniques used to determine an authenticity of the product, and using the one or more selected validation techniques to determine the authenticity of the product based on the XID associated with the product. The system and method described herein also provide the technical solution of objectively and automatically updating the one or more selected rules based on analysis of data from the authenticity determination of the product, and determining the authenticity of the product at a mobile device or at a server environment based, for example, on a counterfeit probability.

FIG. 1 illustrates an architecture of a counterfeit detection system 100, according to an example of the present disclosure. The counterfeit detection system 100 may generally include a server environment 101 and a client application environment 102. The server and client application environments 101, 102 may be combined into an autonomous system, or disposed separately as shown, for example, for facilitating remote operation and reducing storage and processing requirements of the client application environment 102. The server environment 101 may include a XID server 103 that may communicate with further servers (not shown) and databases 104 in a cloud 105. The client application environment 102 may include a mobile device 106, such as, for example, a personal digital assistant (PDA), a smart phone, a tablet or a remote personal computer (PC). The server environment 101 may generally include a validation module 107 to validate authenticity of a product 108, such as, for example, food, clothing or electronic merchandise that include a XID 109. The XID 109 may be a code that includes information, such as, for example, a manufacturer name, a merchandise name, a product size, a product color, a product price, and location (i.e., geographic information) of a product. A client counterfeit detection application 110 on the mobile device 106 may read the XID 109, look up an appropriate rule and trigger an appropriate validation technique as described herein. The validation module 107 may use a validation techniques database 111 to store, retrieve and update a plurality of validation techniques 112. The validation module 107 may dynamically determine one or more of the validation techniques 112 that are suitable to determine authenticity of the product 108. A validation rules module 113 may use a validation rules database 114 to store, retrieve and update a plurality of validation rules 115. The validation rules module 113 may use appropriate validation rules 115 based on which one or more of the foregoing validation techniques 112 is chosen by the validation module 107. The validation rules 115 may be based on factors, such as, for example, a manufacturer name, a type of merchandise (i.e., product), price of merchandise, etc. A validation rules update module 116 is to dynamically update the validation rules 115 based on analysis of counterfeit data. A client and server decision module 117 is to use client and server decision rules 120 to dynamically determine whether to validate authenticity of the product 108 in the server environment 101, or the client application environment 102, or a combination thereof. A XID generation module 118 is to generate the XID 109 that is applied to the product 108 and used for product authentication. The XIDs 109 may be stored in a XID database 119 for processing as described herein.

As described herein, the modules and other elements of the system 100 may comprise machine readable instructions stored on a non-transitory computer readable medium. In addition, or alternatively, the modules and other elements of the system 100 may comprise hardware or a combination of machine readable instructions and hardware.

Referring to FIG. 1, the validation module 107 may dynamically determine one or more validation techniques 112 that are suitable to determine authenticity of the product 108. A first example of the validation technique 112 may be based on part of a XID, where an authenticity check may be performed by the mobile device 106 including a mobile version of the validation module 107 and the validation rules module 113 (i.e., validation and rules modules on the mobile device 106). For a second example of the validation technique 112, a validation technique may be based on a complete XID, where an authenticity check may be performed by the mobile device 106 using the server environment 101. For a third example of the validation technique 112, a validation technique may be based on existence of a correctly formatted XID, where an authenticity check may be performed by the mobile device 106 using the server environment 101. For a fourth example of the validation technique 112, a validation technique may be based on a location of the product 108, where an authenticity check may be performed by the mobile device 106 using the server environment 101. For a fifth example of the validation technique 112, a validation technique may be based on a sale of the product 108, where an authenticity check may be performed by the mobile device 106 using the server environment 101. For a sixth example of the validation technique 112, a validation technique may be based on physical characteristics of the product 108, where an authenticity check may be performed by the mobile device 106 using the server environment 101 and input from a user of the mobile device 106. For a seventh example of the validation technique 112, a validation technique may be based on physical characteristics of the product 108, where an authenticity check may be performed by the mobile device 106 using the server environment 101 and no input from the user of the mobile device 106 (i.e., automatically using the server environment 101). For an eighth example of the validation technique 112, a validation technique may be based on a hidden pattern provided for the product 108, where an authenticity check may be performed by the mobile device 106 using the server environment 101 and no input from the user of the mobile device 106 (i.e., automatically using the server environment 101). The foregoing validation techniques 112 may be designated Validation #1-#8 for facilitating an explanation of use of the validation techniques 112. One of skill in the art will appreciate that other validation techniques not disclosed may be used without departing from the scope of the disclosure.

The validation rules module 113 may use appropriate validation rules 115 based on which one or more of the foregoing validation techniques 112 is chosen by the validation module 107. The validation rules 115 may be used based on a variety of factors, such as, for example, a parameter associated with the product 108, a characteristic of the product 108, a business relationship between two entities (e.g., a vendor and a XID service provider, or a vendor and a consumer, etc.). For example, for a clothing product, Validation #1-#8 may be used, whereas for certain food (e.g., wine) products, Validation #1-#6 may be used. Using the example of a clothing product, such as, for example, a shirt, a sample set of the validation rules 115 may include:

1. If the Manufacturer=XYZ, Merchandise=PQR and Price<$X, then use Validation #1.
2. If the Manufacturer=ABC, Merchandise=DEF and Price>$X, then use Validation #1-3.
3. If the Manufacturer=XYZ, Merchandise=PQR and Price>$Y, then use Validation #1-6.
4. If the Manufacturer=ABC, Merchandise=DEF and Price>$Z, then use Validation #1-8.

One of skill in the art will appreciate that other rules not disclosed may be used without departing from the scope of the disclosure.

The validation rules update module 116 is to dynamically update the validation rules 115 based on analysis of counterfeit data. For example, if the number of counterfeits for a given manufacturer, merchandise and price (e.g., price>$X) for a product 108 is greater than a predetermined threshold (e.g., 10 counterfeits), then a rule may be inserted to use different combinations of the validation techniques 112. For example, the validation rules update module 116 may include the following specifications:

If the number of counterfeits for [Manufacturer XYZ, Merchandise PQR, Price>$X]>Threshold_MMP_1 then
Insert the rule: If the Manufacturer=XYZ, Merchandise=PQR, Price>$X then use Validation #1-3
Else-if the number of counterfeits for [Manufacturer XYZ, Merchandise PQR, Price>$Y]>Threshold_MMP_2 then
Insert the rule: If the Manufacturer=XYZ, Merchandise=PQR, Price>$Y then use Validation #1-6
Else-if the number of counterfeits for [Manufacturer XYZ, Merchandise PQR, Price>$Z]>Threshold_MMP_3 then
Insert the rule: If the Manufacturer=XYZ, Merchandise=PQR, Price>$Z then use Validation #1-8.

For the foregoing example of the specifications of the validation rules update module 116, MMP may refer to the combination manufacturer (M), merchandise (M) and price (P), and Threshold_MMP may refer to a threshold associated with the combination of manufacturer, merchandise and price. The validation rules 115 may be updated at predetermined intervals (e.g., hourly) based, for example, on product specifications or manufacturer requirements.

In another example, the validation rules update module 116 may include the following specifications:

If the number of counterfeits for [Manufacturer XYZ, Merchandise PQR]>Threshold_MM_1 then
Insert the rule: If the Manufacturer=XYZ, Merchandise=PQR then use Validation #1-3
Else-if the number of counterfeits for [Manufacturer XYZ, Merchandise PQR]>Threshold_MM_2 then
Insert the rule: If the Manufacturer=XYZ, Merchandise=PQR then use Validation #1-6
Else-if the number of counterfeits for [Manufacturer XYZ, Merchandise PQR]>Threshold_MM_3 then
Insert the rule: If the Manufacturer=XYZ, Merchandise=PQR then use Validation #1-8

In another example, the validation rules update module 116 may include the following specifications:

If the number of counterfeits for Manufacturer XYZ>Threshold_M_1 then
Insert the rule: If the Manufacturer=XYZ, then use Validation #1-3
Else-if the number of counterfeits for Manufacturer XYZ>Threshold_M_2 then
Insert the rule: If the Manufacturer=XYZ, then use Validation #1-6
Else-if the number of counterfeits for Manufacturer XYZ>Threshold_M_3 then
Insert the rule: If the Manufacturer=XYZ, then use Validation #1-8

The validation rules 115 may be either locally updated at the mobile device 106 or updated and pushed by the server environment 101 to the mobile device 106.

In order to compute the number of counterfeits used by the validation rules update module 116 to dynamically alter the validation rules 115 or a set of the validation rules 115 used for a product 108, the validation rules update module 116 may include a counter that is incremented. For example, the validation rules update module 116 may increment the counter as follows:

If a counterfeit is detected for [Manufacturer XYZ, Merchandise PQR, Price>$X]>then
Increment the count corresponding to [Manufacturer=XYZ, Merchandise=PQR, Price>$X]
Else-if a counterfeit is detected for [Manufacturer XYZ, Merchandise PQR, Price>$Y]>then
Increment the count corresponding to [Manufacturer=XYZ, Merchandise=PQR, Price>$Y]
Else-if a counterfeit is detected for [Manufacturer XYZ, Merchandise PQR, Price>$Z]>then
Increment the count corresponding to [Manufacturer=XYZ, Merchandise=PQR, Price>$Z]

In another example, the validation rules update module 116 may increment the counter as follows:

If a counterfeit is detected for [Manufacturer XYZ, Merchandise PQR]>then
Increment the count corresponding to [Manufacturer=XYZ, Merchandise=PQR]

In another example, the validation rules update module 116 may increment the counter as follows:

If a counterfeit is detected for [Manufacturer XYZ]>then
Increment the count corresponding to [Manufacturer=XYZ]

The validation rules 115 may be based on a variety of other factors, such as, for example, geography or physical characteristics, such as, for example, size or color associated with a product. These aspects may be chosen based on the counterfeit potential of a product 108 or based on historical analysis. For example, for the validation rules 115 based on geography, the validation rules update module 116 may include the following specifications:

If the number of counterfeits for [Manufacturer XYZ, Merchandise PQR, Price>$X, Geo=A]>Threshold_MMPG_1 then
Insert the rule: If the Manufacturer=XYZ, Merchandise=PQR, Price>$X, Geo=A then use Validation #1-3
Else-if the number of counterfeits for [Manufacturer XYZ, Merchandise PQR, Price>$Y, Geo=A]>Threshold_MMPG_2 then
Insert the rule: If the Manufacturer=XYZ, Merchandise=PQR, Price>$Y, Geo=A then use Validation #1-6
Else-if the number of counterfeits for [Manufacturer XYZ, Merchandise PQR, Price>$Z, Geo=A]>Threshold_MMPG_3 then
Insert the rule: If the Manufacturer=XYZ, Merchandise=PQR, Price>$Z, Geo=A then use Validation #1-8

For the foregoing example of the specifications of the validation rules update module 116 for the validation rules 115 based on geography, Threshold_MMPG may refer to a threshold associated with the combination of manufacturer (M), merchandise (M), price (P), and geography (G).

In another example, for the validation rules 115 based on size, the validation rules update module 116 may include the following specifications:

If the number of counterfeits for [Manufacturer XYZ, Merchandise PQR, Price>$X, Size=S]>Threshold_MMPS_1 then Insert the rule: If the Manufacturer=XYZ, Merchandise=PQR, Price>$X, Size=S then use Validation #1-3

Else-if the number of counterfeits for [Manufacturer XYZ, Merchandise PQR, Price>$Y, Size=S]>Threshold_MMPS_2 then Insert the rule: If the Manufacturer=XYZ, Merchandise=PQR, Price>$Y, Size=S then use Validation #1-6

Else-if the number of counterfeits for [Manufacturer XYZ, Merchandise PQR, Price>$Z, Size=S]>Threshold_MMPS_3 then Insert the rule: If the Manufacturer=XYZ, Merchandise=PQR, Price>$Z, Size=S then use Validation #1-8

For the foregoing example of the specifications of the validation rules update module 116 for the validation rules 115 based on size, Threshold_MMPS may refer to a threshold associated with the combination of manufacturer (M), merchandise (M), price (P), and size (S).

In another example, for the validation rules 115 based on color, the validation rules update module 116 may include the following specifications:

If the number of counterfeits for [Manufacturer XYZ, Merchandise PQR, Price>$X, Color=B]>Threshold_MMPC_1 then Insert the rule: If the Manufacturer=XYZ, Merchandise=PQR, Price>$X, Color=B then use Validation #1-3

Else-if the number of counterfeits for [Manufacturer XYZ, Merchandise PQR, Price>$Y, Color=B]>Threshold_MMPC_2 then Insert the rule: If the Manufacturer=XYZ, Merchandise=PQR, Price>$Y, Color=B then use Validation #1-6

Else-if the number of counterfeits for [Manufacturer XYZ, Merchandise PQR, Price>$Z, Color=B]>Threshold_MMPC_3 then Insert the rule: If the Manufacturer=XYZ, Merchandise=PQR, Price>$Z, Color=B then use Validation #1-8

For the foregoing example of the specifications of the validation rules update module 116 for the validation rules 115 based on color, Threshold_MMPC may refer to a threshold associated with the combination of manufacturer (M), merchandise (M), price (P), and color (C).

In order to compute the number of counterfeits used by the validation rules update module 116 to dynamically alter the rules set including the validation rules 115, for the validation rules 115 based on geography, the validation rules update module 116 may include the following specifications:

If a counterfeit is detected for [Manufacturer XYZ, Merchandise PQR, Price>$X, Geo=A] then Increment the count corresponding to [Manufacturer=XYZ, Merchandise=PQR, Price>$X, Geo=A]

Else-if a counterfeit is detected for [Manufacturer XYZ, Merchandise PQR, Price>$Y, Geo=A] then Increment the count corresponding to [Manufacturer=XYZ, Merchandise=PQR, Price>$Y, Geo=A]

Else-if a counterfeit is detected for [Manufacturer XYZ, Merchandise PQR, Price>$Z, Geo=A] then Increment the count corresponding to [Manufacturer=XYZ, Merchandise=PQR, Price>$Z, Geo=A]

In another example of computing the number of counterfeits used by the validation rules update module 116, for the validation rules 115 based on size, the validation rules update module 116 may include the following specifications:

If a counterfeit is detected for [Manufacturer XYZ, Merchandise PQR, Price>$X, Size=S] then Increment the count corresponding to [Manufacturer=XYZ, Merchandise=PQR, Price>$X, Size=S]

Else-if a counterfeit is detected for [Manufacturer XYZ, Merchandise PQR, Price>$Y, Size=S] then Increment the count corresponding to [Manufacturer=XYZ, Merchandise=PQR, Price>$Y, Size=S]

Else-if a counterfeit is detected for [Manufacturer XYZ, Merchandise PQR, Price>$Z, Size=S] then Increment the count corresponding to [Manufacturer=XYZ, Merchandise=PQR, Price>$Z, Size=S]

In another example of computing the number of counterfeits used by the validation rules update module 116, for the validation rules 115 based on color, the validation rules update module 116 may include the following specifications:

If a counterfeit is detected for [Manufacturer XYZ, Merchandise PQR, Price>$X, Color=B] then Increment the count corresponding to [Manufacturer=XYZ, Merchandise=PQR, Price>$X, Color=B]

Else-if a counterfeit is detected for [Manufacturer XYZ, Merchandise PQR, Price>$Y, Color=B] then Increment the count corresponding to [Manufacturer=XYZ, Merchandise=PQR, Price>$Y, Color=B]

Else-if a counterfeit is detected for [Manufacturer XYZ, Merchandise PQR, Price>$Z, Color=B] then Increment the count corresponding to [Manufacturer=XYZ, Merchandise=PQR, Price>$Z, Color=B]

The client and server decision module 117 is to use the client and server decision rules 120 to dynamically determine whether to validate authenticity of the product 108 in the server environment 101 or the client application environment 102. The determination of whether a validation technique is executed in the server environment 101 or the client application environment 102 may be dynamically based on analytics performed by the XID server 103, for example, to account for the capabilities of the mobile device 106 and the XID server 103. For example, if the likelihood of counterfeiting (i.e., counterfeit probability (i.e., prob)) is low, a check at the client application environment 102 (i.e., the mobile device 106) may be adequate. A check at the client application environment 102 may also be needed if connectivity to the server environment 101 is limited. Otherwise, a more complex check may be performed in the server environment 101. For example, in order to dynamically determine whether to validate authenticity of the product 108 in the server environment 101 or the client application environment 102, the client and server decision module 117 may include the following specifications for the client and server decision rules 120 based on a manufacturer (M), merchandise (M), price (P), and geographic location (G) of a product 108:

If the item validated [Manufacturer XYZ, Merchandise PQR, Price>$X, Geo=A] has counterfeit Prob<MMPG_1 then Validate at the client
Else
    Validate at the server In the foregoing example using specifications based on a manufacturer, merchandise, price, and geographic location of a product 108, a counterfeit probability MMPG_1 may be specific to the product 108. MMPG may refer to the combination of manufacturer (M), merchandise (M), price (P), and geographic location (G). For example, a counterfeit probability MMPG_1 of 0.7 may be set for a type of a clothing product, where a counterfeit probability<0.7 would require authenticity validation in the client application environment 102, and otherwise in the server environment 101.

In another example, the client and server decision module 117 may include the following specifications for the client and server decision rules 120 based on a manufacturer, merchandise, price and size of a product 108:
  If the item validated [Manufacturer XYZ, Merchandise PQR, Price>$X, Size=S] has counterfeit Prob<MMPS_1 then
    Validate at the client
  Else
    Validate at the server In the foregoing example, MMPS may refer to the combination of manufacturer (M), merchandise (M), price (P), and size (S).

In another example, the client and server decision module 117 may include the following specifications for the client and server decision rules 120 based on a manufacturer, merchandise, and price of a product 108:
  If the item validated [Manufacturer XYZ, Merchandise PQR, Price>$X] has counterfeit Prob<MMP_1 then
    Validate at the client
  Else
    Validate at the server In the foregoing example, MMP may refer to the combination of manufacturer (M), merchandise (M), and price (P).

In another example, the client and server decision module 117 may include the following specifications for the client and server decision rules 120 based on a manufacturer, and merchandise of a product 108:
  If the item validated [Manufacturer XYZ, Merchandise PQR] has counterfeit Prob<MM_1 then
    Validate at the client
  Else
    Validate at the server In the foregoing example, MM may refer to the combination of manufacturer (M), and merchandise (M).

In another example, the client and server decision module 117 may include the following specifications for the client and server decision rules 120 based on a manufacturer (M) of a product 108:
  If the item validated [Manufacturer XYZ] has counterfeit Prob<M_1 then
    Validate at the client
  Else
    Validate at the server In order to compute the counterfeit probability used by the client and server decision module 117 to dynamically determine whether to validate authenticity of the product 108 in the server environment 101 or the client application environment 102, the counterfeit probability may be computed as follows:
  If a counterfeit validation is requested for [Manufacturer XYZ, Merchandise PQR, Price>$X, Geo=A]>then
    Increment the count corresponding to Checked_[Manufacturer=XYZ, Merchandise=PQR, Price>$X, Geo=A]
  If a counterfeit is detected for [Manufacturer XYZ, Merchandise PQR, Price>$X, Geo=A]>then
    Increment the count corresponding to Detected_[Manufacturer=XYZ, Merchandise=PQR, Price>$X, Geo=A]
  Compute Prob. of Counterfeit_[Manufacturer XYZ, Merchandise PQR, Price>$X, Geo=A]=Detected_[Manufacturer=XYZ, Merchandise=PQR, Price>$X, Geo=A]/Checked_[Manufacturer=XYZ, Merchandise=PQR, Price>$X, Geo=A]

In the foregoing example using specifications based on a manufacturer, merchandise, price, and geographic location of a product 108, the counterfeit probability may be based on the detected versus checked counterfeits for specifications based on a manufacturer, merchandise, price, and geographic location.

In another example, the counterfeit probability may be computed based on specifications based on a manufacturer, merchandise, price, and size as follows:
  If a counterfeit validation is requested for [Manufacturer XYZ, Merchandise PQR, Price>$X, Size=S]>then
    Increment the count corresponding to Checked_[Manufacturer=XYZ, Merchandise=PQR, Price>$X, Size=S]
  If a counterfeit is detected for [Manufacturer XYZ, Merchandise PQR, Price>$X, Size=S]>then
    Increment the count corresponding to Detected_[Manufacturer=XYZ, Merchandise=PQR, Price>$X, Size=S]
  Compute Prob. of Counterfeit_[Manufacturer XYZ, Merchandise PQR, Price>$X, Size=S]=Detected_[Manufacturer=XYZ, Merchandise=PQR, Price>$X, Size=S]/Checked_[Manufacturer=XYZ, Merchandise=PQR, Price>$X, Size=S]

In another example, the counterfeit probability may be computed based on specifications based on a manufacturer, merchandise, and price as follows:
  If a counterfeit validation is requested for [Manufacturer XYZ, Merchandise PQR, Price>$X]>then
    Increment the count corresponding to Checked_[Manufacturer=XYZ, Merchandise=PQR, Price>$X]
  If a counterfeit is detected for [Manufacturer XYZ, Merchandise PQR, Price>$X]>then
    Increment the count corresponding to Detected_[Manufacturer=XYZ, Merchandise=PQR, Price>$X]
  Compute Prob. of Counterfeit_[Manufacturer XYZ, Merchandise PQR, Price>$X]=Detected_[Manufacturer=XYZ, Merchandise=PQR, Price>$X]/Checked_[Manufacturer=XYZ, Merchandise=PQR, Price>$X]

In another example, the counterfeit probability may be computed based on specifications based on a manufacturer, and merchandise as follows:
  If a counterfeit validation is requested for [Manufacturer XYZ, Merchandise PQR]>then
    Increment the count corresponding to Checked_[Manufacturer=XYZ, Merchandise=PQR]
  If a counterfeit is detected for [Manufacturer XYZ, Merchandise PQR]>then
    Increment the count corresponding to Detected_[Manufacturer=XYZ, Merchandise=PQR]

Compute Prob. of Counterfeit_[Manufacturer XYZ, Merchandise PQR]=Detected_[Manufacturer=XYZ, Merchandise=PQR]/Checked_[Manufacturer=XYZ, Merchandise=PQR]

In another example, the counterfeit probability may be computed based on specifications based on a manufacturer as follows:

If a counterfeit validation is requested for [Manufacturer XYZ]>then
   Increment the count corresponding to Checked_[Manufacturer=XYZ]
If a counterfeit is detected for [Manufacturer XYZ]>then
   Increment the count corresponding to Detected_[Manufacturer=XYZ]
Compute Prob. of Counterfeit_[Manufacturer XYZ]=Detected_[Manufacturer=XYZ]/Checked_[Manufacturer=XYZ]

The client and server decision module 117 may thus use the client and server decision rules 120 to dynamically determine whether to validate authenticity of the product 108 in the server environment 101 or the client application environment 102. For example, if network connectivity is low, an authenticity check at the client application environment 102 may be adequate, and otherwise, a more complex check may be performed in the server environment 101. For specific manufacturers or specific products, authenticity checks may be required in the server environment 101. Authenticity checks may also be required in the server environment 101 for certain geographic locations, or if a counterfeit detection probability is below a predetermined threshold. Specific rules and validation techniques that are determined to be executed by the mobile device 106 may be provided on the mobile device 106, for example, as validation techniques 121, validation rules 122, and client and server decision rules 123. The mobile device 106 may also include a client and server decision module 124 that uses the client and server decision rules 123 to dynamically determine whether to validate authenticity of the product 108 in the server environment 101 or the client application environment 102.

The counterfeit detection system 100 may also include a local cache that is built and includes a list of items that may be ordered by the probability of being a counterfeit and stored in the mobile device 106 which is used for counterfeit detection. The probability calculation may be performed as discussed herein and a subset of items may be cached in the mobile device 106. The information that is cached in a specific mobile device may also be driven by a rule set. For example, if the mobile device 106 is used for counterfeit validation in Geo=A (i.e., geographic location A), then the counterfeit detection system 100 may store the most frequently detected counterfeits of Geo=A in the mobile device 106 for local validation at the client application environment 102. In another example, if the mobile device 106 is used in different geographic locations, the counterfeit detection system 100 may store the most frequently detected counterfeits in the mobile device 106 for local validation at the client application environment 102. In another example, if the mobile device 106 is used for detecting counterfeits for a specific manufacturer, the counterfeit detection system 100 may store the most frequently detected counterfeit products of the manufacturer in the mobile device 106 for local validation at the client application environment 102.

Figure 2:
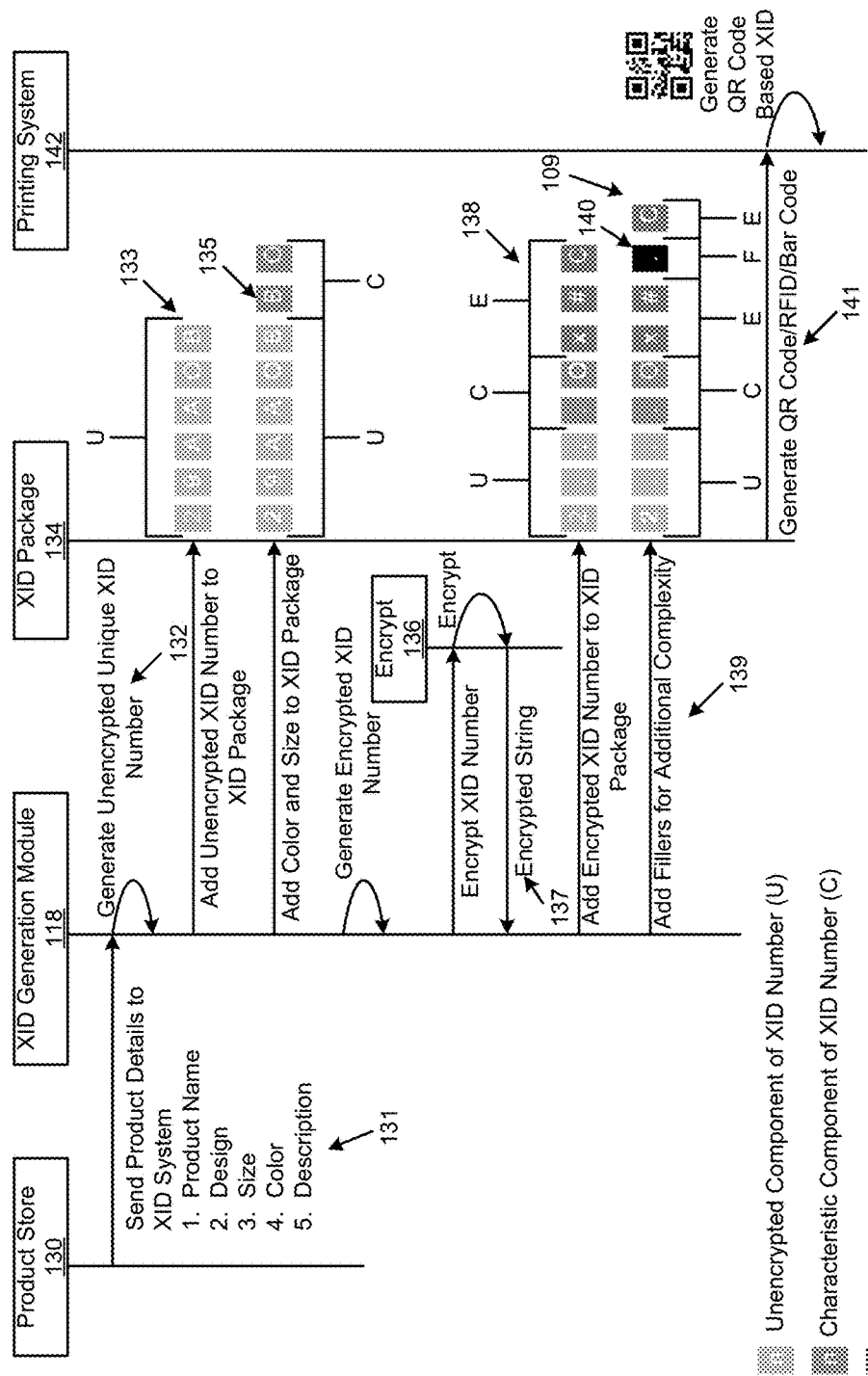
FIG. 2 illustrates a layout for generation of a hybrid XID, according to an example of the present disclosure.

FIG. 2 illustrates a layout for generation of a hybrid XID code (i.e., the XID 109), according to an example of the present disclosure. Referring to FIGS. 1 and 2, the XID generation module 118 is to generate the XID 109 that is applied to the product 108 and used for product authentication. In order to generate the XID 109, the XID generation module 118 may receive details of a product 108 from a product store 130. For example, at 131, the XID generation module 118 may receive a product name, design, size, color and other description associated with the product 108. At 132, the XID generation module 118 may generate, for example, a n-digit (e.g., 8 digits) number denoted an unencrypted XID, or UX at 133. The unencrypted XID 133 may be added to a XID package 134. The unencrypted XID 133 may follow a mathematical process to ensure that it is non-intuitive to duplicate. One example of such a mathematical process may include generating the unencrypted XID 133 as follows:

Hexadecimal+$3^{rd}$ Digit is C+Divisible by 5 and A

The mathematical process may be modified depending on the level of complexity needed for a particular application.

The XID generation module 118 may retrieve characteristics of the product 108, such as, for example, size (e.g., small (S), medium (M), large (L), extra-large (XL), etc.), and color (e.g., red (R), green (G), blue (B), etc.). These characteristics may be added to the unencrypted XID 133 at 135.

The XID generation module 118 may further generate, for example, a m-digit (e.g., 16 digit) number. The m-digit number may be encrypted at 136 and stored in an encrypted format denoted an encrypted XID, or EX at 137. Alternatively, instead of generating a m-digit number and encrypting the m-digit number, the n-digit unencrypted XID may be encrypted at 136. The encrypted XID at 137 may be appended to the end of the unencrypted XID 133 (i.e., concatenated with the unencrypted XID) including the characteristics at 135, with the entire XID code being denoted a first form of a hybrid XID at 138. The decision to choose n-digits for the n-digit unencrypted XID and m-digits for the m-digit number or a m-digit encrypted part of the hybrid XID may be based, for example, on the product parameters and capability of the mobile device 106 and XID server 103. For example, the number of digits n may be increased for mobile devices 106 that are capable of processing more information such that more information is available to a user of the mobile device 106 without having to resort to XID validity confirmation from the XID server 103. For the first form of the hybrid XID at 138, in an example, the unencrypted and encrypted portions of the first form of the hybrid XID may be respectively analyzed by the mobile device 106 and the XID server 103.

At 139, the XID generation module 118 may add inert filler bytes at 140 to the first form of the hybrid XID at 138 to increase the complexity. The XID generation module 118 may also shuffle the location of the various components of the first form of the hybrid XID at 138 for adding security, for example, by using a character mapping process for shuffling of the various components and thereafter accurate retrieval thereof. The final hybrid XID including the shuffled components and the inert filler bytes at 140 may be designated the XID 109, which may be used to generate a quick response (QR) code, a radio-frequency identification (RFID), bar code, or another type of code at 141 that is printed at 142 and applied to the product 108.

Figure 3:
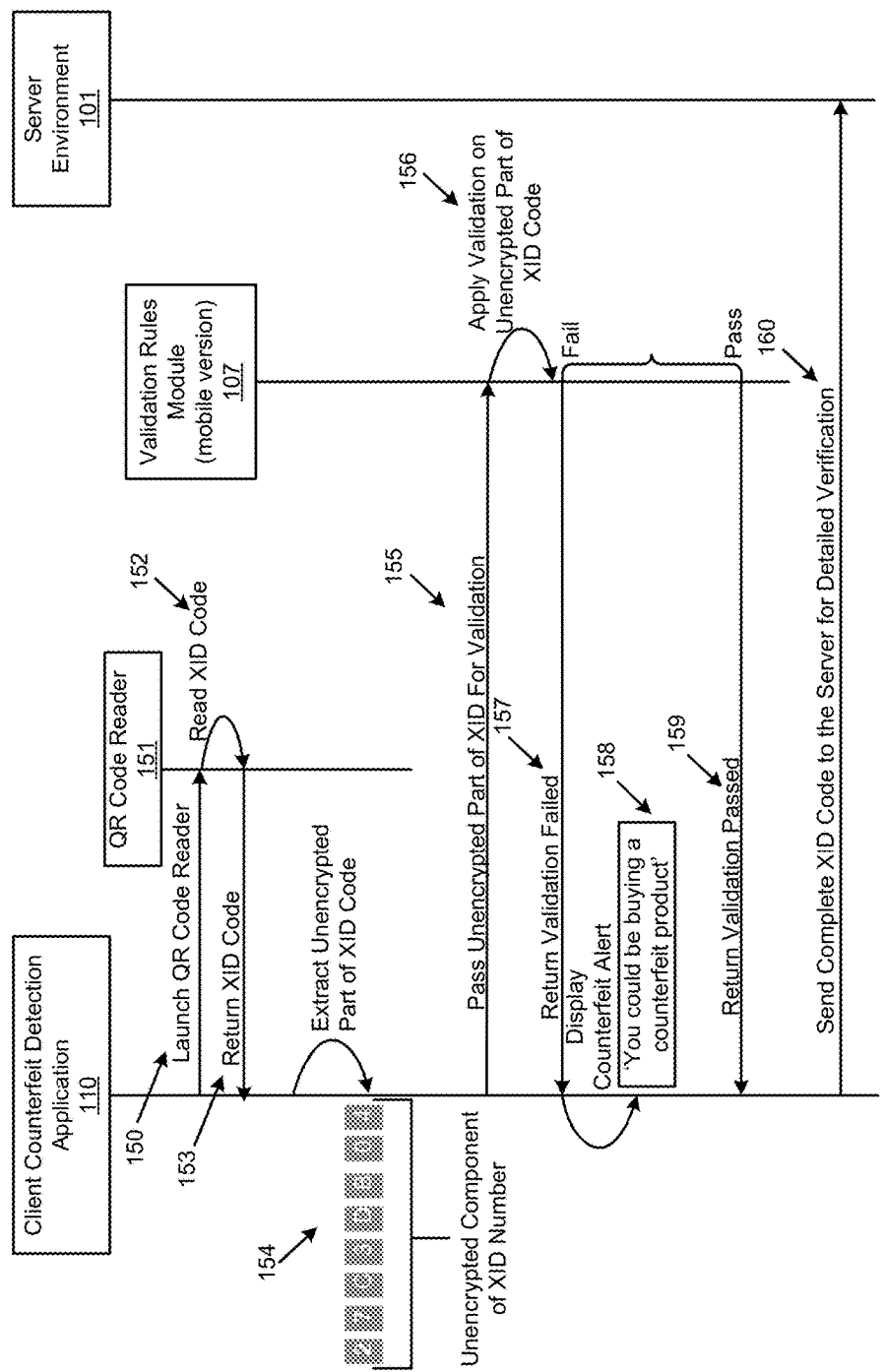
FIG. 3 illustrates a validation layout for a client XID check, according to an example of the present disclosure.

FIG. 3 illustrates a validation layout for a client XID check, according to an example of the present disclosure. Referring to FIGS. 1 and 3, the example of FIG. 3 refers to the foregoing first example of the validation technique 112, which may be based on part of a XID (e.g., the n-digit unencrypted XID), where an authenticity check may be performed by the mobile device 106 including a mobile version of the validation module 107 and the validation rules module 113. At 150, a QR code reader 151 of the mobile device 106 may be launched to read the XID 109 at 152. At 153, the XID 109 that is read may be returned to the client counterfeit detection application 110 on the mobile device 106. At 154, the n-digit unencrypted XID may be extracted from the XID 109. At 155, the n-digit unencrypted XID may be forwarded to the mobile version of the validation module 107 on the mobile device 106. Based on the validation determination at 156, at 157, if a determination is made that the n-digit unencrypted XID is invalid, a counterfeit alert 158 may be generated. At 159, if a determination is made that the n-digit unencrypted XID is valid, at 160, the complete XID 109 may be sent to the XID server 103 for detailed verification of the XID 109. The validation logic of FIG. 3 thus determines if the n-digit unencrypted XID has been generated by the XID generation module 118, or is an identification (ID) generated by a counterfeiter.

Figure 4:
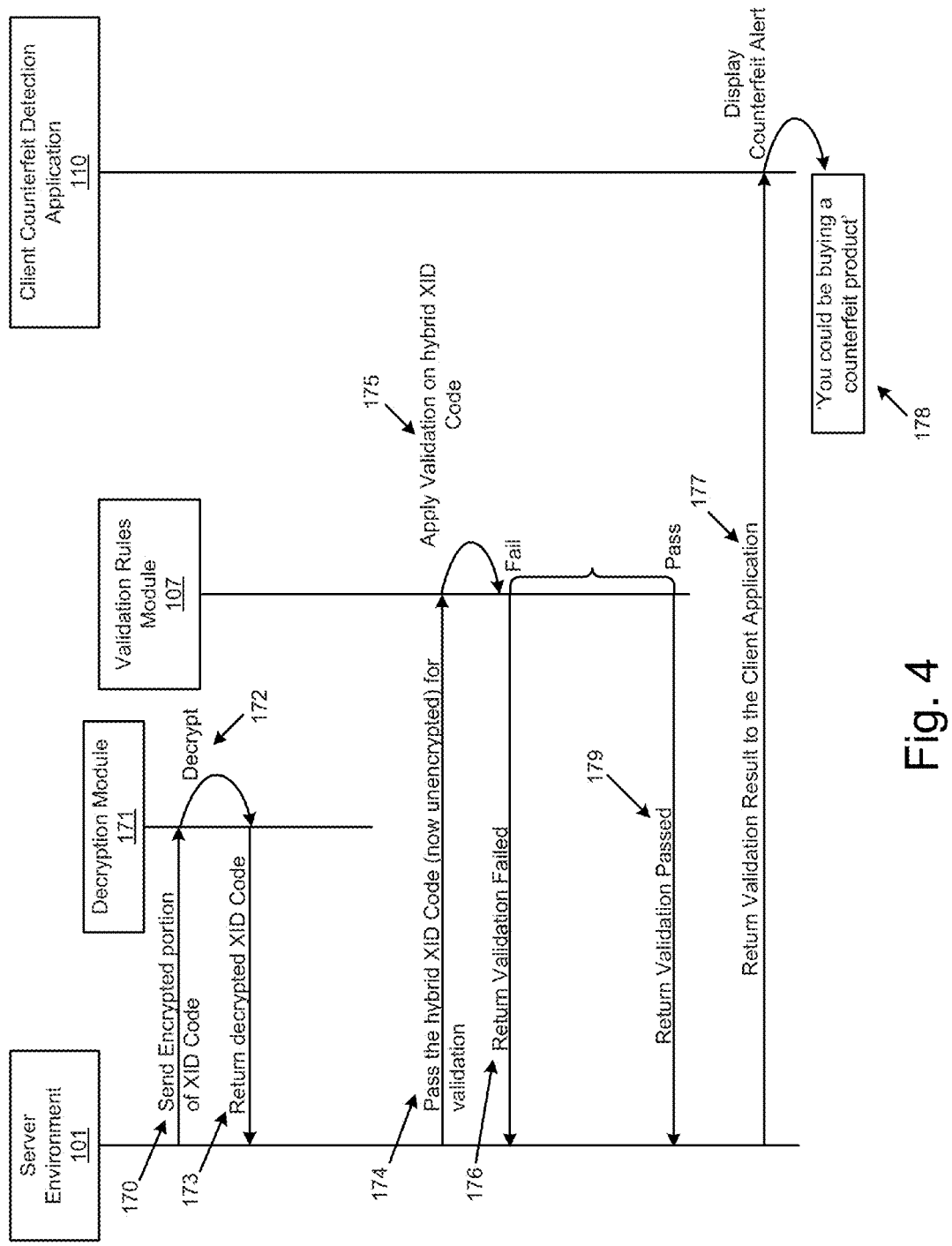
FIG. 4 illustrates a validation layout for a server XID format check, according to an example of the present disclosure.

FIG. 4 illustrates a validation layout for a server XID format check, according to an example of the present disclosure. Referring to FIGS. 1 and 4, the example of FIG. 4 refers to an example of a XID format check, which may be based on the m-digit encrypted part of the hybrid XID (i.e., XID 109), where an authenticity check may be performed by the mobile device 106 using the server environment 101. At 170, a decryption module 171 that may be part of the validation module 107 may be launched to decrypt the m-digit encrypted part of the hybrid XID at 172 (the QR code reader 151 of the mobile device 106 may be used to read the XID 109). At 173, the decrypted m-digit encrypted part of the hybrid XID may be returned from the decryption module 171. At 174, the complete decrypted hybrid XID (i.e., including the n-digit unencrypted XID and decrypted m-digit encrypted part) may be forwarded to the validation module 107 of the server environment 101. Alternatively, at 174, the decrypted m-digit encrypted part of the hybrid XID may be forwarded to the validation module 107 of the server environment 101. Based on the validation determination at 175, at 176, if a determination is made that the complete decrypted hybrid XID or the decrypted m-digit encrypted part of the hybrid XID is invalid, at 177, a validation failed result may be sent to the client counterfeit detection application 110 on the mobile device 106. If a validation failed result is sent to the client counterfeit detection application 110 on the mobile device 106, at 178, a counterfeit alert may be generated. At 179, if a determination is made that the complete decrypted hybrid XID or the decrypted m-digit encrypted part of the hybrid XID is valid, at 177, a validation passed result may be sent to the client counterfeit detection application 110 on the mobile device 106. The validation logic of FIG. 4 thus determines if the complete decrypted hybrid XID or the m-digit encrypted part of the hybrid XID has been generated by the XID generation module 118 based on the XID format, or is an ID generated by a counterfeiter.

Figure 5:
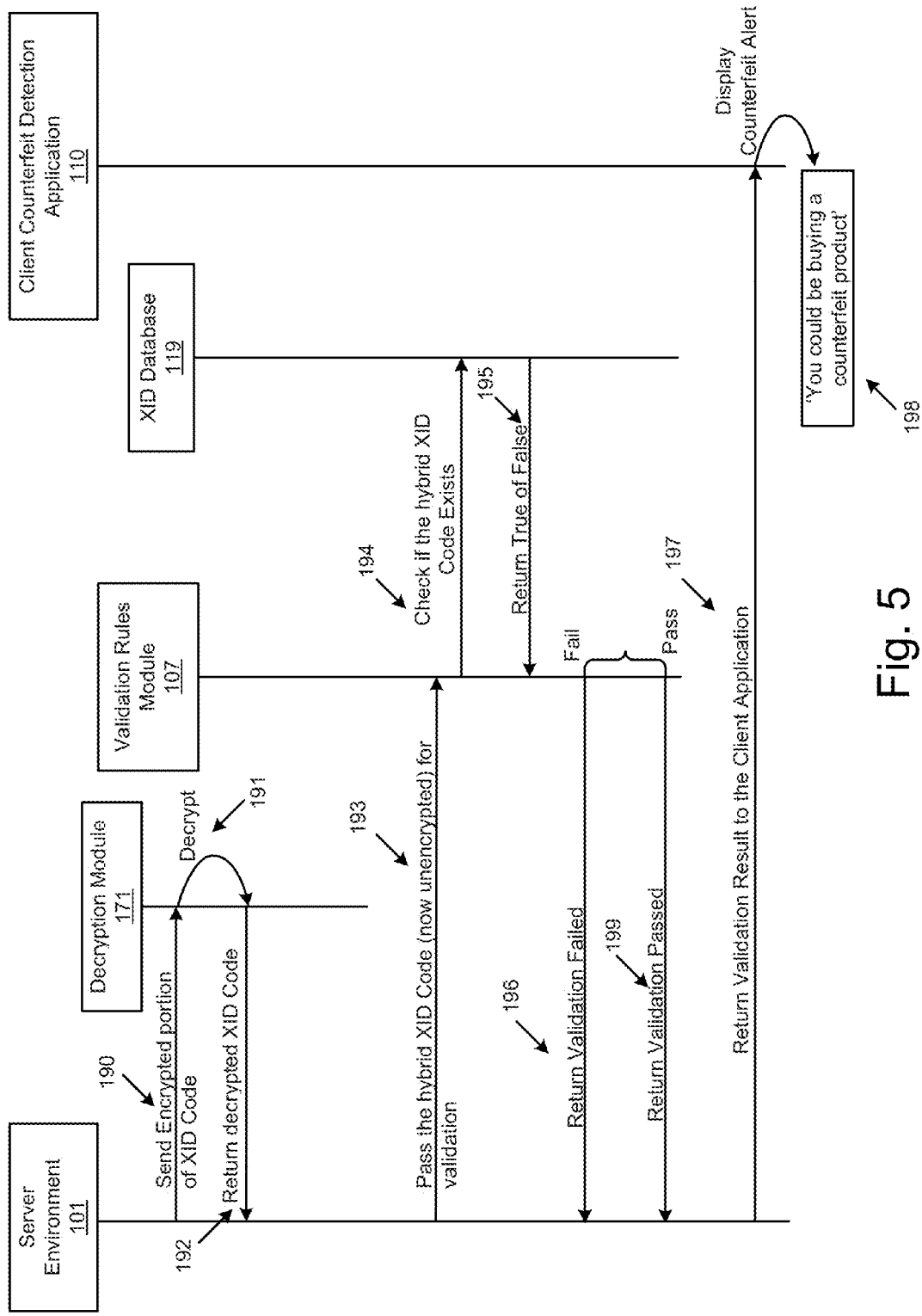
FIG. 5 illustrates a validation layout for a server XID existence check, according to an example of the present disclosure.

FIG. 5 illustrates a validation layout for a server XID existence check, according to an example of the present disclosure. Referring to FIGS. 1 and 5, the example of FIG. 5 refers to the foregoing third example of the validation technique 112, which may be based on existence of a correctly formatted XID, where an authenticity check may be performed by the mobile device 106 using the server environment 101. Based on the capacity of the mobile device 106, the authenticity check may be performed by the mobile device 106 without using the server environment 101. At 190, the decryption module 171 may be launched to decrypt the m-digit encrypted part of the hybrid XID at 191 (the QR code reader 151 of the mobile device 106 may be used to read the XID 109). At 192, the decrypted m-digit encrypted part of the hybrid XID may be received from the decryption module 171. At 193, the complete decrypted hybrid XID (i.e., including the n-digit unencrypted XID and decrypted m-digit encrypted part) may be forwarded to the validation module 107 of the server environment 101. Alternatively, at 193, the decrypted m-digit encrypted part of the hybrid XID may be forwarded to the validation module 107 of the server environment 101. At 194, the XID database 119 may be checked to determine if the complete decrypted hybrid XID or the decrypted m-digit encrypted part of the hybrid XID exists (i.e., the XID 109 was indeed generated by the XID generation module 118 and not an unauthorized third-party). At 195, the response from the determination at 194 may be evaluated. At 196, if a determination is made that the complete decrypted hybrid XID or the decrypted m-digit encrypted part of the hybrid XID does not exist, at 197, a validation failed result may be sent to the client counterfeit detection application 110 on the mobile device 106. At 198, a counterfeit alert may be displayed on the mobile device 106. At 199, if a determination is made that the complete decrypted hybrid XID or the decrypted m-digit encrypted part of the hybrid XID exists, at 197, a validation passed result may be sent to the client counterfeit detection application 110 on the mobile device 106. The validation logic of FIG. 5 thus determines if the complete decrypted hybrid XID or the m-digit encrypted part of the hybrid XID has been generated by the XID generation module 118 based on existence of a correctly formatted XID, or is an ID generated by a counterfeiter.

Figure 6:
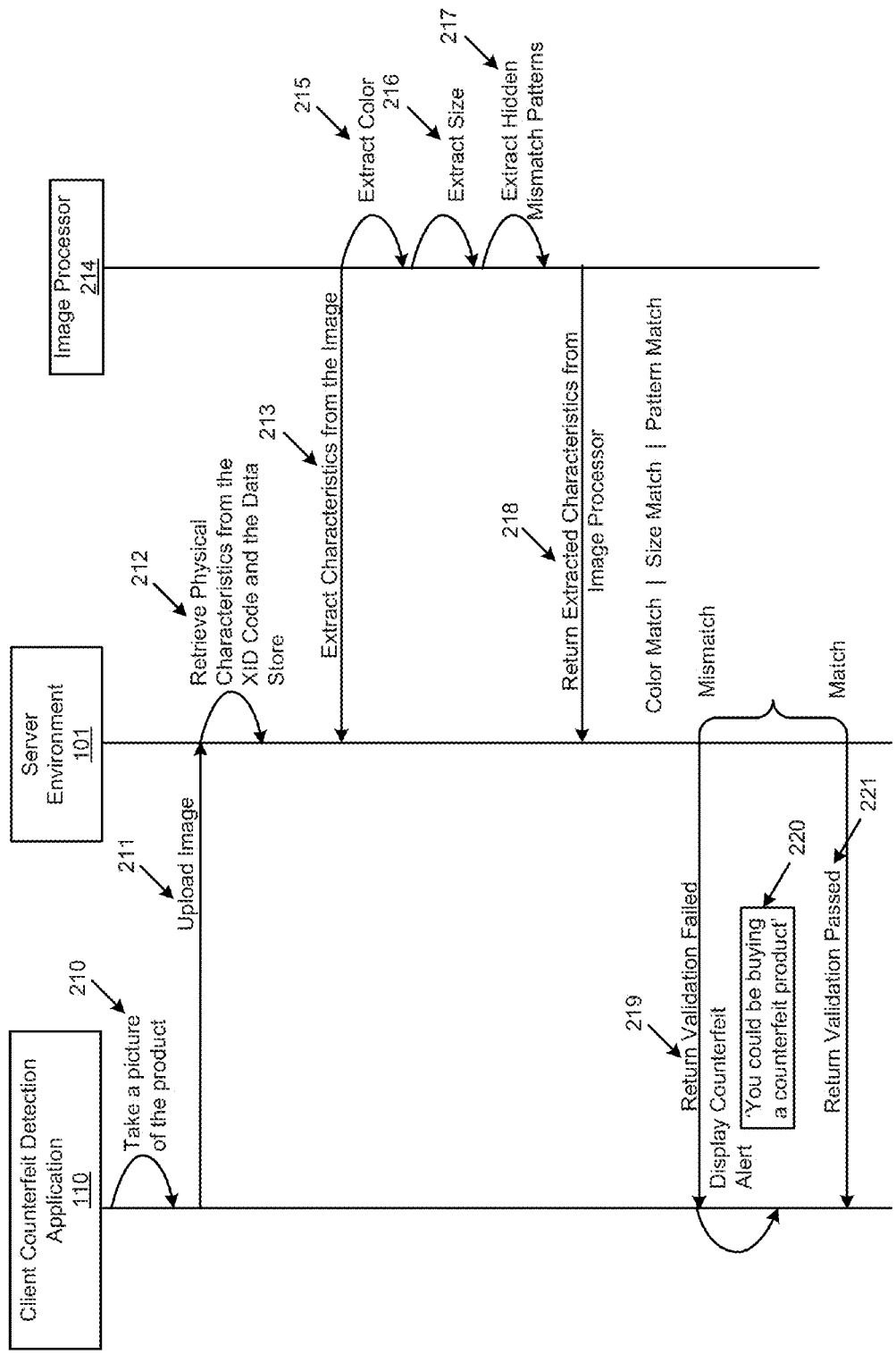
FIG. 6 illustrates a validation layout for an automated image characteristics check, according to an example of the present disclosure.

FIG. 6 illustrates a validation layout for an automated image characteristics check, according to an example of the present disclosure. Referring to FIGS. 1 and 6, the example of FIG. 6 refers to the foregoing sixth and seventh examples of the validation technique 112, which may be based on physical characteristics of the product 108, where an authenticity check may be performed by the mobile device 106 using the server environment 101 and input from a user of the mobile device 106 or no input from the user of the mobile device 106 (i.e., automatically using the server environment 101). Based on the capacity of the mobile device 106, the authenticity check may be performed by the mobile device 106 without using the server environment 101. At 210, the client counterfeit detection application 110 on the mobile device 106 may be launched to take a picture of the product 108, and the QR code reader 151 of the mobile device 106 may be used to read the XID 109. At 211, the product image and the associated XID 109 may be uploaded to the XID server 103 in the server environment 101. At 212, the XID server 103 may use the logic associated with the XID generation module 118 to retrieve physical characteristics from the XID 109. The physical characteristics and associated XID codes 109 may be stored in the XID database 119. At 213, an image processor 214 of the server environment 101 may be used to extract characteristics from the product image, such as, for example, color at 215, size at 216 and hidden patterns (e.g., altered stitches on a purse) at 217. At 218, the extracted characteristics from the product image may be returned, for example, to the validation module 107 to match to the physical characteristics retrieved from the XID 109. Based on the validation determination at 218, at 219, if a determination is made that the XID 109 does not match the associated product characteristics extracted from the product image, at 220, a counterfeit alert may be generated. At 221, if a determination is made that the XID 109 matches the associated product characteristics extracted from the product image, an authentication alert may be generated.

Figure 7:
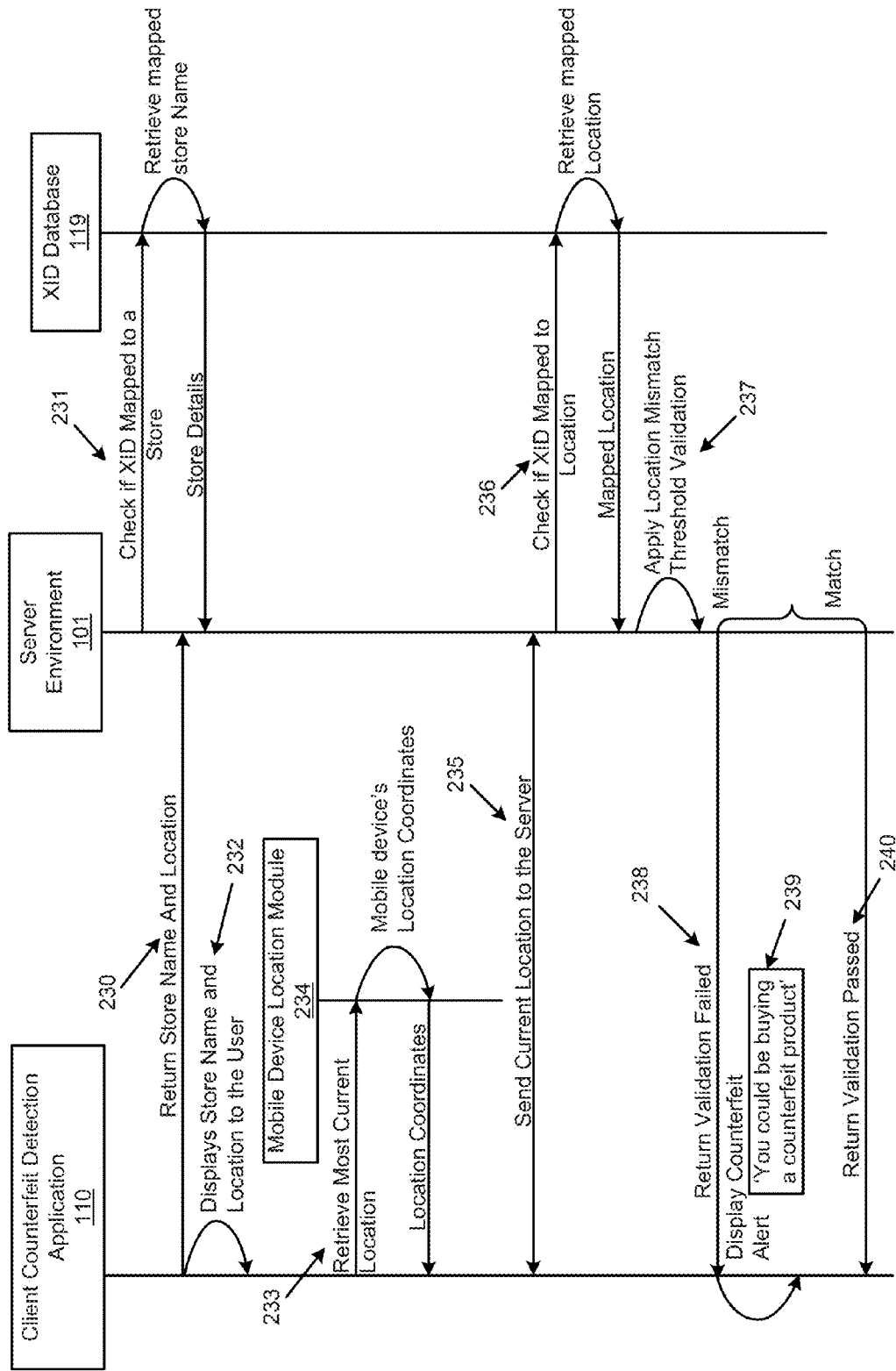
FIG. 7 illustrates a validation layout for a location check, according to an example of the present disclosure.

FIG. 7 illustrates a validation layout for a location check, according to an example of the present disclosure. Referring to FIGS. 1 and 7, the example of FIG. 7 refers to the foregoing fourth example of the validation technique 112, which may be based on a location of the product 108, where an authenticity check may be performed by the mobile device 106 using the server environment 101. At 230, the client counterfeit detection application 110 on the mobile device 106 may be launched to determine a store name and location where the product is being sold, and the QR code reader 151 of the mobile device 106 may be used to read the XID 109. The store name, location and XID 109 may be forwarded to the server environment 101, where at 231, the validation module 107 and the XID database 119 may be used to determine if the XID 109 is mapped to the store. At 232, the store name and location mapped to the XID 109 may be displayed on the mobile device 106. This allows a user of the mobile device 106 to determine if the store is indeed authorized to sell the product 108. At 233, a mobile device location module 234 on the mobile device 106 may be used to determine a current location of the mobile device 106. At 235, the current location of the mobile device 106 may be sent to the XID server 103. At 236, the validation module 107 and the XID database 119 may be used to determine if the XID 109 is mapped to the current location of the mobile device 106. At 237, a location threshold (e.g., 20 feet) may be used to determine if the XID 109 indeed matches the current location of the mobile device 106 within the location threshold. Based on the validation determination at 237, at 238, if a determination is made that the XID 109 does not match the associated store name and location for the product 108, or the XID 109 does not match the current location of the mobile device 106, at 239, a counterfeit alert may be generated. At 240, if a determination is made that the XID 109 matches the associated store name and location for the product 108, and the XID 109 matches the current location of the mobile device 106, an authentication alert may be generated.

Figure 8:
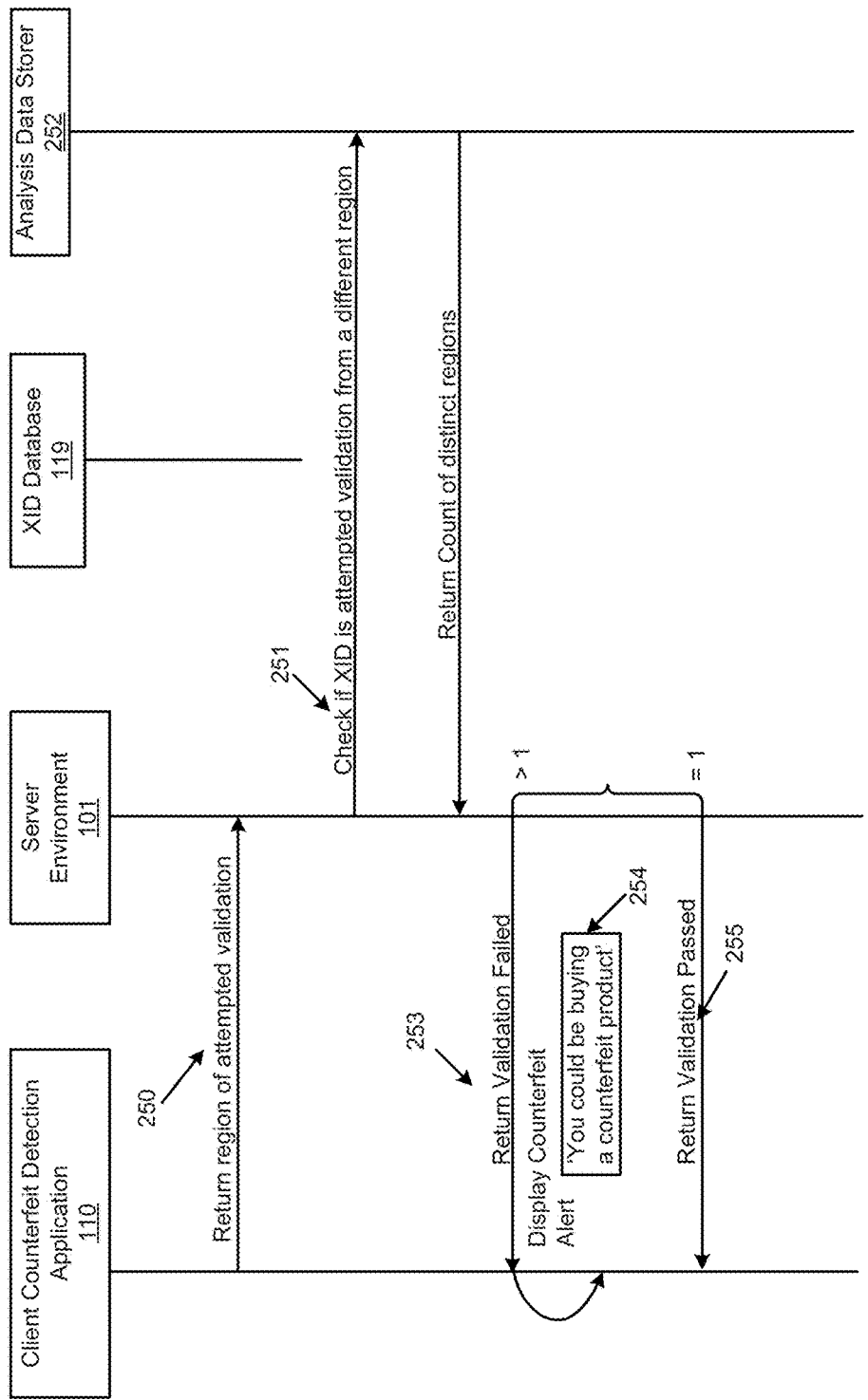
FIG. 8 illustrates another validation layout for a location check, according to an example of the present disclosure.

FIG. 8 illustrates a validation layout for a location check, according to an example of the present disclosure. Referring to FIGS. 1 and 8, the example of FIG. 8 refers to an example of a validation based on a region for an attempted validation, where an authenticity check may be performed by the mobile device 106 using the server environment 101. At 250, the client counterfeit detection application 110 on the mobile device 106 may be launched to determine a region of attempted validation, and the QR code reader 151 of the mobile device 106 may be used to read the XID 109. The region of attempted validation and XID 109 may be forwarded to the server environment 101, where the validation module 107 and the XID database 119 may be used to determine if the XID 109 is mapped to region of attempted validation. If the attempted validation is from a different region compared to the region that is mapped to the XID 109, then at 251, an analysis data store 252 may be used to determine a count of distinct regions where the product 108 is to be sold. For example, an electronic product associated with a particular XID 109 may be sold in Europe as opposed to North America based on electricity constraints. If the number of distinct regions where the product 108 is to be sold is greater than 1, at 253, then a determination is made that the XID 109 is not mapped to region of attempted validation, and at 254, a counterfeit alert may be generated. At 255, if a determination is made that the number of distinct regions where the product 108 is to be sold is equal to 1, the XID 109 is mapped to region of attempted validation, and an authentication alert may be generated.

Figure 9:
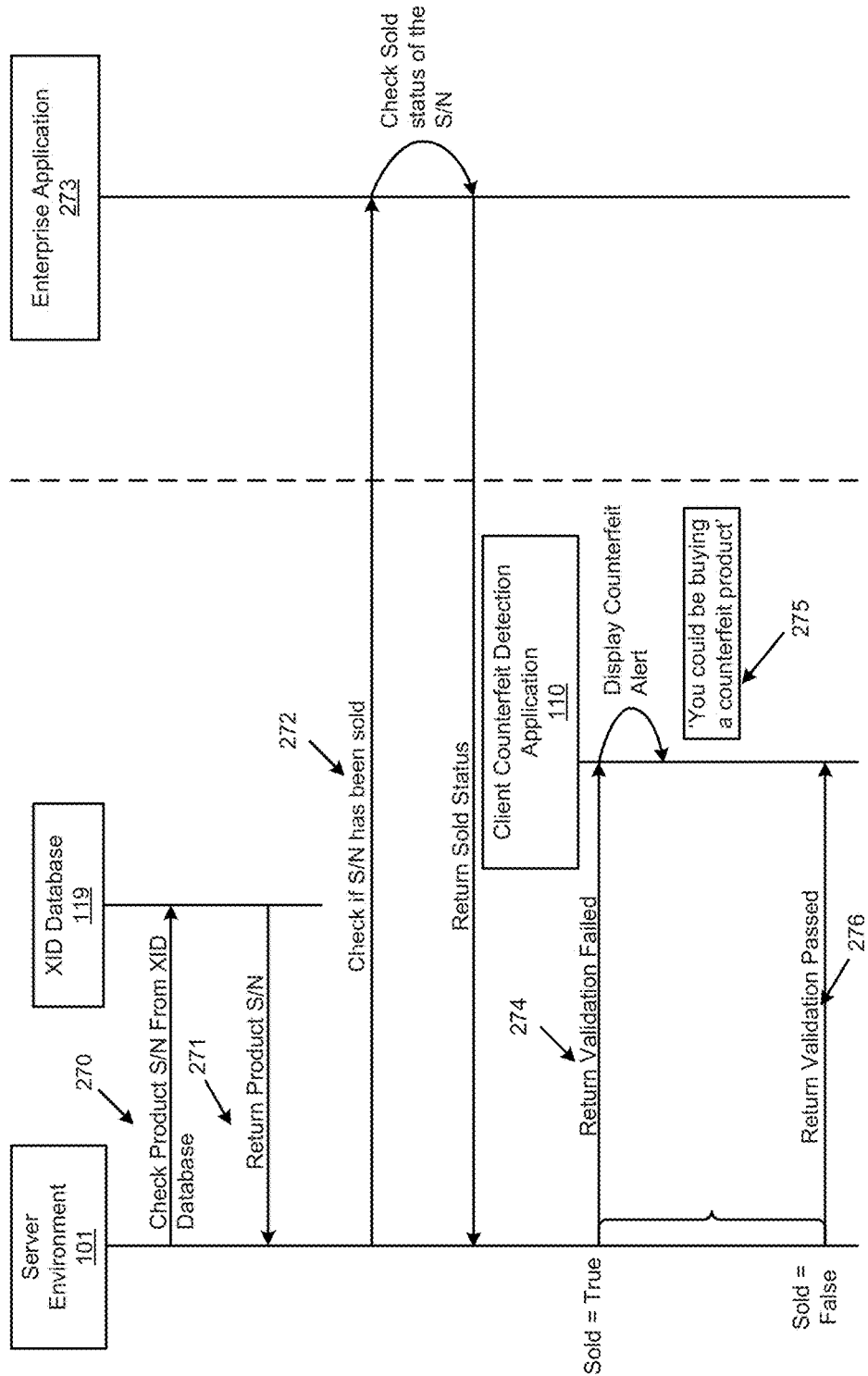
FIG. 9 illustrates a validation layout for a sale based check, according to an example of the present disclosure.

FIG. 9 illustrates a validation layout for a sale based check, according to an example of the present disclosure. Referring to FIGS. 1 and 9, the example of FIG. 9 refers to the foregoing fifth example of the validation technique 112, which may be based on a sale of the product 108, where an authenticity check may be performed by the mobile device 106 using the server environment 101. At 270, the QR code reader 151 of the mobile device 106 may be used to read the XID 109, and at 271, the XID code may be used to determine a serial number of the product 108 from the XID database 119. At 272, an enterprise application 273 that may be part of the server environment 101 or separate from the server environment 101 may be used to determine if the determined serial number is for a product 108 that has been previously sold. If the serial number is for a product 108 that has been previously sold (i.e., the determination that the serial number is for a product 108 that has been sold is true), at 274, a determination is made that the product 108 is a counterfeit, and at 275, a counterfeit alert may be generated. At 276, if a determination is made that the serial number is for a product 108 that has not been previously sold (i.e., the determination that the serial number is for a product 108 that has been sold is false), and an authentication alert may be generated.

Figure 10:
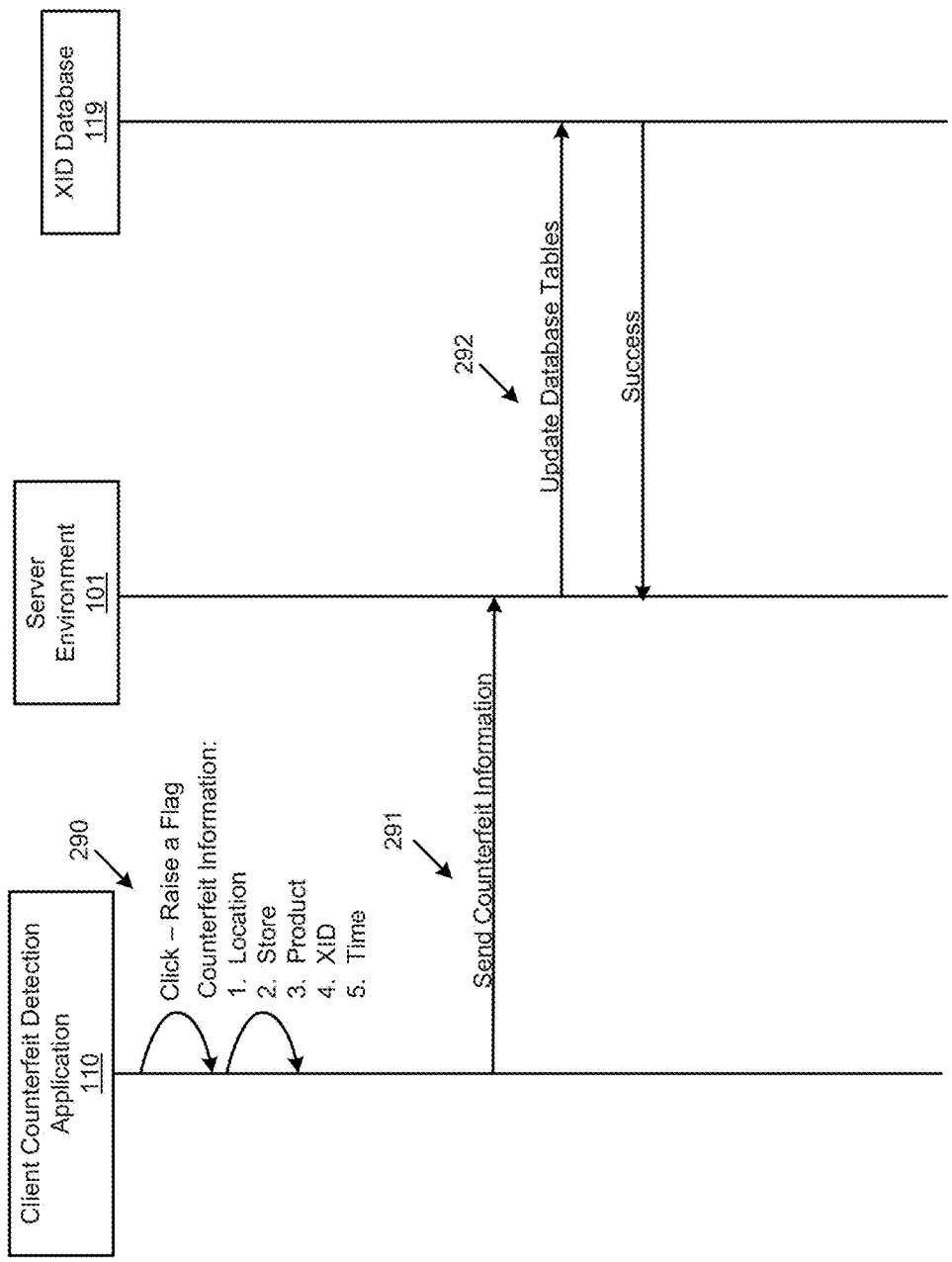
FIG. 10 illustrates a layout for a database update, according to an example of the present disclosure.

FIG. 10 illustrates a layout for a database update, according to an example of the present disclosure. Referring to FIGS. 1 and 10, as discussed herein with reference to the foregoing validation technique 112, if a counterfeit or authentic product alert is generated, at 290, information, such as, for example, a store location and name, product details, XID and time of the alert may be ascertained. At 291, the information ascertained at 290 may be forwarded to the server environment 101. At 292, the information sent at 291 to the server environment 101 may be stored in the XID database 119 and used as discussed herein with reference to the foregoing examples and validation techniques 112.

Figure 11:
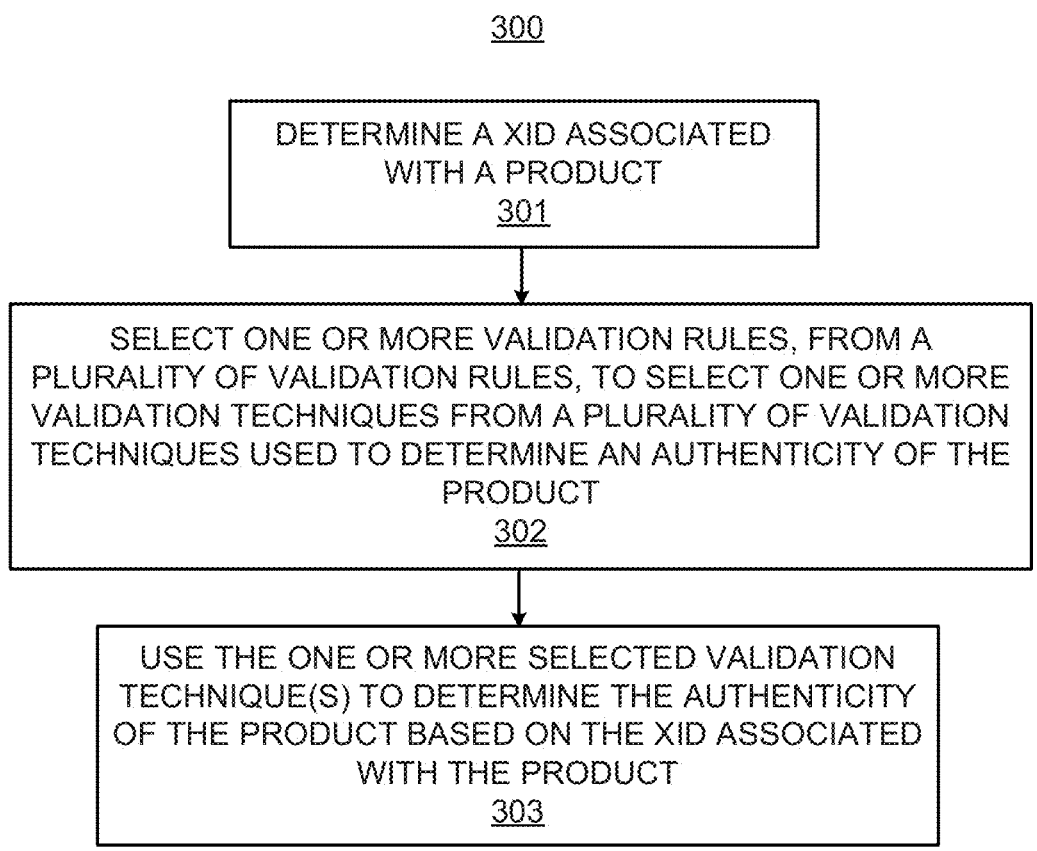
FIG. 11 illustrates a method for counterfeit detection, according to an example of the present disclosure.

FIG. 11 illustrates a flowchart of a method 300 for counterfeit detection, according to examples. The method 300 may be implemented on the counterfeit detection system described above with reference to FIGS. 1-10 by way of example and not limitation. The method 300 may be practiced in other systems.

Referring to FIG. 11, at block 301, a XID associated with a product may be determined. For example, referring to FIGS. 1 and 3, at 150, a QR code reader 151 of the mobile device 106 may be launched to read the XID 109. The XID may include an unencrypted component and/or an encrypted component associated with a parameter associated with the product. Referring to FIGS. 1 and 2, the XID generation module 118 may generate the XID 109 that is applied to the product 108 and used for product authentication. At 132, the XID generation module 118 may generate, for example, a n-digit (e.g., 8 digits) number denoted an unencrypted XID, or UX at 133. The XID generation module 118 may further generate, for example, a m-digit (e.g., 16 digit) number. The m-digit number may be encrypted at 136 and stored in an encrypted format denoted an encrypted XID, or EX at 137. Alternatively, instead of generating a m-digit number and encrypting the m-digit number, the n-digit unencrypted XID may be encrypted at 136.

At block 302, one or more validation rules may be selected, from a plurality of validation rules, to select one or more validation techniques from a plurality of validation techniques used to determine an authenticity of the product.

For example, referring to FIG. 1, the validation rules module 113 may use appropriate validation rules 115 based on which one or more of the foregoing validation techniques 112 is chosen by the validation module 107. The validation rules module 113 may further select one or more validation rules 115 that select one or more validation techniques 112 used to determine an authenticity of the product At block 303, the one or more selected validation techniques may be used to determine the authenticity of the product based on the XID associated with the product.

Figure 12:
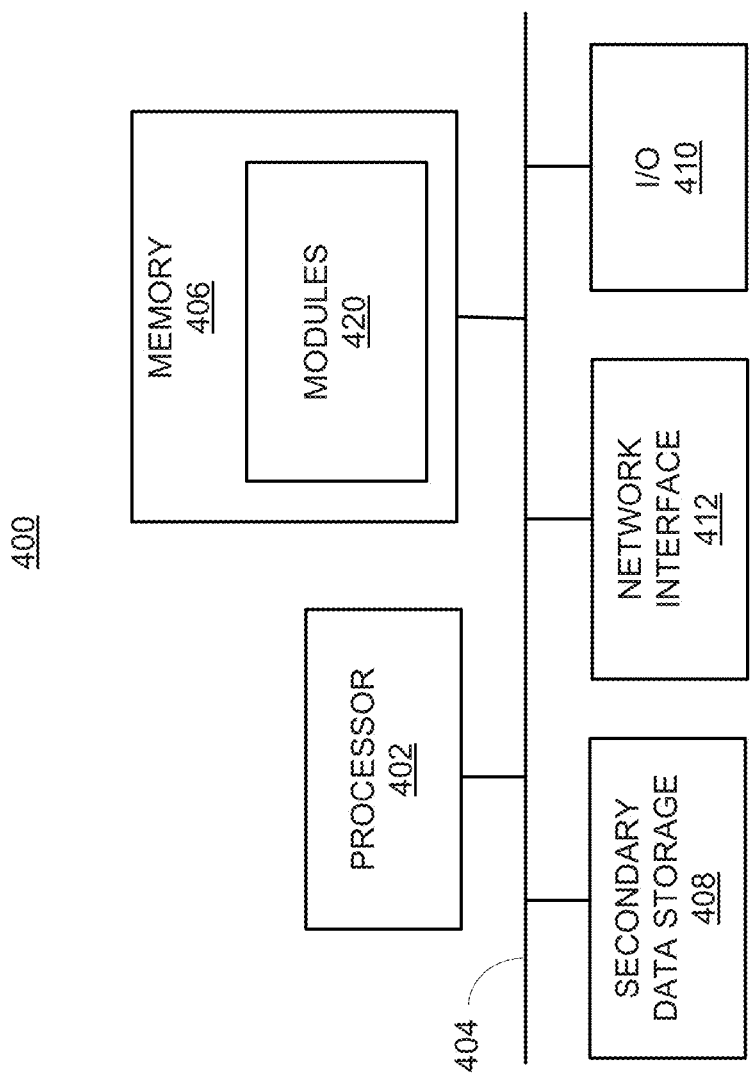
FIG. 12 illustrates a computer system, according to an example of the present disclosure.

FIG. 12 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules of the system 100 described with reference to FIGS. 1-10.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A counterfeit detection system to reduce resource consumption of a mobile device comprising:
    the mobile device to:
        determine a X-identification (XID) associated with a product, wherein the XID includes at least one of an unencrypted component and an encrypted component associated with the product that further includes an associated parameter;
        select at least one validation rule, from a plurality of validation rules, to select at least one validation technique from a plurality of validation techniques used to determine an authenticity of the product, wherein the at least one validation rule includes using the at least one selected validation technique based on a comparison of the parameter associated with the product to a predetermined price threshold, and wherein the parameter associated with the product includes a price of the product associated with at least one of a product manufacturer name, a product name, a product size, a color associated with the product, a size associated with the product, and a geographic location of the product for comparison with the predetermined price threshold; and
        determine, by at least one hardware processor, whether to validate the authenticity of the product using the mobile device or in a server environment based on at least one client and server decision rule related to another parameter associated with the product,
            wherein the at least one client and server decision rule related to the another parameter associated with the product includes a determination of a low versus a high level of data transmission connectivity related to the mobile device or the server environment,
            wherein the low level of data transmission connectivity represents a limited data transmission rate at which data is transmitted to the server environment,
            wherein the authenticity of the product is validated using the mobile device at the low level of data transmission connectivity, without validation using the server environment,
            wherein the authenticity of the product is validated using the mobile device or the server environment above the low level of data transmission connectivity, and
            wherein the mobile device is to execute, based on the determination of whether to validate the authenticity of the product using the mobile device or in the server environment, the at least one selected validation technique using the mobile device or in the server environment to
                determine the authenticity of the product based on the XID associated with the product, and
                reduce the resource consumption of the mobile device when the at least one selected validation technique is executed in the server environment.

2. The counterfeit detection system of claim 1, wherein the at least one validation rule further includes:
    using the at least one selected validation technique based on a determination of whether a further parameter associated with the product matches a predetermined value.

3. The counterfeit detection system of claim 1, wherein the at least one validation rule further includes:
    using the at least one selected validation technique based on a business relationship between two entities.

4. The counterfeit detection system of claim 1, wherein the mobile device is to:
    update the at least one selected validation rule based on analysis of data from the authenticity determination of the product.

5. The counterfeit detection system of claim 1, wherein the mobile device is to select the at least one validation rule, from the plurality of validation rules, to select the at least one validation technique from the plurality of validation techniques used to determine the authenticity of the product by selecting the at least one validation rule, from the plurality of validation rules, to select a combination of validation techniques including the at least one validation technique from the plurality of validation techniques used to determine the authenticity of the product.

6. The counterfeit detection system of claim 1, wherein the mobile device is to select a combination of validation techniques including the at least one validation technique from the plurality of validation techniques used to determine the authenticity of the product based on a comparison of a number of counterfeits to a predetermined counterfeit threshold, and a progressively increasing number of validation techniques including the at least one validation technique and the combination of validation techniques from the plurality of validation techniques used to determine the authenticity of the product to correspond to determination of a progressively increasing number of the counterfeits for the product.

7. The counterfeit detection system of claim 1, wherein the at least one client and server decision rule related to the another parameter associated with the product further includes a determination of whether an authenticity check is required in the server environment.

8. The counterfeit detection system of claim 1, wherein frequently detected counterfeit products for authenticity validation are stored using the mobile device based on a determination of a particular manufacturer associated with the counterfeit products.

9. The counterfeit detection system of claim 1, wherein the at least one validation technique includes:
using, based on the determination of whether to validate the authenticity of the product using the mobile device or in the server environment, the unencrypted component of the XID with the mobile device, and based on determination of a validity of the unencrypted component of the XID at the mobile device, using the unencrypted and encrypted components of the XID at the server environment to determine the authenticity of the product.

10. The counterfeit detection system of claim 1, wherein the XID is a hybrid XID and includes n-digits of the unencrypted component concatenated with m-digits of the encrypted component, and wherein a length of the n-digits of the unencrypted component is increased based on an increase in processing capability of the mobile device to directly reduce a requirement for validating the authenticity of the product using the server environment, and a length of the m-digits of the encrypted component is increased based on an increase in processing capability of the server environment.

11. The counterfeit detection system of claim 1, wherein frequently detected counterfeit products for authenticity validation are stored using the mobile device based on a determination of a location associated with the mobile device, and wherein, based on use of the mobile device at a different location, different frequently detected counterfeit products for authenticity validation are stored using the mobile device based on the determination of the different location associated with the mobile device.

12. The counterfeit detection system of claim 1,
wherein the XID is a hybrid XID,
wherein the hybrid XID includes an unencrypted component and an encrypted component, and
wherein the mobile device is to determine whether the XID is generated by a counterfeiter by
determining, at the mobile device, whether the unencrypted component of the XID is valid,
in response to a determination that the unencrypted component of the XID is valid, utilizing the server environment to determine whether the encrypted component is valid, and
in response to a determination that the unencrypted component of the XID is invalid, designating the XID as being generated by a counterfeiter.

13. The counterfeit detection system of claim 1, wherein the at least one validation technique includes:
determining whether a geographic location of the mobile device exceeds a location threshold for a geographic location assigned to the XID associated with the product to determine the authenticity of the product.

14. The counterfeit detection system of claim 1, wherein the at least one validation technique includes:
determining whether a geographic location of the mobile device and the geographic location of the product exceeds a number of geographic locations assigned to the XID associated with the product to determine the authenticity of the product, wherein the number of geographic locations is greater than two.

15. The counterfeit detection system of claim 1, wherein the mobile device is to:
update the at least one selected validation rule based on a comparison of a number of counterfeits for the product to another predetermined threshold, wherein updating the at least one selected validation rule includes inserting, in place of the at least one selected validation rule, a different validation rule that uses different combinations of validation techniques from the plurality of validation techniques.

16. The counterfeit detection system of claim 15, wherein the another predetermined threshold is based on at least two parameters associated with the product.

17. A method for counterfeit detection for reducing resource consumption of a mobile device, the method comprising:
determining, by the mobile device, a X-identification (XID) associated with a product, wherein the XID includes at least one of an unencrypted component and an encrypted component associated with the product that further includes an associated parameter;
selecting, by the mobile device, at least one validation rule, from a plurality of validation rules, to select at least one validation technique from a plurality of validation techniques used to determine an authenticity of the product;
determining, by at least one hardware processor of the mobile device, whether to validate the authenticity of the product using the mobile device or in a server environment respectively based on a low versus a high level of data transmission connectivity related to the mobile device or the server environment to reduce the resource consumption of the mobile device when the at least one selected validation technique is executed in the server environment,
wherein the low level of data transmission connectivity represents a limited data transmission rate at which data is transmitted to the server environment,
wherein the authenticity of the product is validated using the mobile device at the low level of data transmission connectivity, without validation using the server environment, and wherein the authenticity of the product is validated using the mobile device or the server environment above the low level of data transmission connectivity; and executing the at least one selected validation technique at the mobile device or at the server environment based on a comparison of a counterfeit probability to a predetermined counterfeit threshold to determine the authenticity of the product based on the XID associated with the product.

18. The method of claim 17, further comprising:
computing the counterfeit probability based on an evaluation of requested counterfeit validations and detected counterfeits.

19. A non-transitory computer readable medium having stored thereon machine readable instructions for counterfeit detection for reducing resource consumption of a mobile device, the machine readable instructions when executed cause at least one hardware processor to:

determine, by the mobile device, a X-identification (XID) associated with a product, wherein the XID includes at least one of an unencrypted component and an encrypted component associated with the product that further includes an associated parameter;

select, by the mobile device, at least one validation rule, from a plurality of validation rules, to select at least one validation technique from a plurality of validation techniques used to determine an authenticity of the product;

determine, by at least one hardware processor of the mobile device, whether to validate the authenticity of the product using the mobile device or in a server environment respectively based on a low versus a high level of data transmission connectivity related to the mobile device or the server environment to reduce the resource consumption of the mobile device when the at least one selected validation technique is executed in the server environment, wherein the low level of data transmission connectivity represents a limited data transmission rate at which data is transmitted to the server environment, wherein the authenticity of the product is validated using the mobile device at the low level of data transmission connectivity, without validation using the server environment, and wherein the authenticity of the product is validated using the mobile device or the server environment above the low level of data transmission connectivity; and execute the at least one selected validation technique at the mobile device or in the server environment based on the determination of whether to validate the authenticity of the product using the mobile device or in the server environment to determine the authenticity of the product based on the XID associated with the product.

* * * * *